(12) United States Patent
Epstein

(10) Patent No.: US 6,526,505 B1
(45) Date of Patent: Feb. 25, 2003

(54) DES ENCRYPTION SYSTEM

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/257,080

(22) Filed: Feb. 24, 1999

Related U.S. Application Data

(60) Provisional application No. 60/093,404, filed on Jul. 20, 1998.

(51) Int. Cl.[7] ............................................. G06F 1/24
(52) U.S. Cl. .................. 713/150; 713/151; 713/153; 713/168
(58) Field of Search ............................... 713/150, 151, 713/153, 168

(56) References Cited

U.S. PATENT DOCUMENTS

| | | | | |
|---|---|---|---|---|
| 4,668,103 A | * | 5/1987 | Wilson | 380/30 |
| 5,398,283 A | * | 3/1995 | Virga | 283/73 |
| 6,049,608 A | * | 4/2000 | Ablowitz et al. | 380/265 |

OTHER PUBLICATIONS

Verbauwhede I et al., "Security and Performance Optimization of a new DES Data Encryption Chip", IEEE Journal of Solid–State Circuits, vol. 23, No. 3, Jun. 1988, pp. 647–656, XP000112776.

* cited by examiner

Primary Examiner—Thomas R. Peeso
(74) Attorney, Agent, or Firm—Daniel J. Piotrowski

(57) ABSTRACT

A DES permutation is presented that has minimal crossovers between the DES 64-bit structure and 32-bit data structures, allows for efficient data transfers via a 32-bit data bus. Every other bit location in the DES 64-bit data structure is mapped to a contiguous bit location in the 32-bit data structure, in a sequential order. The sequential mapping to contiguous bit locations minimizes potential crossovers that are area inefficient, and allows for encoding algorithms that effect the mapping by using incrementing or shifting operators only.

4 Claims, 8 Drawing Sheets

DES 32-bit Input System

FIG. 4 [Prior Art]

DES ENCRYPTION SYSTEM

This Application claims the benefit of No. 60/093,404, filed Jul. 20, 1998.

BACKGROUND OF THE INVENTION

1. Field of the Invention

This invention relates to the field of data communications, and in particular to the field of secure data communications via systems that employ the Data Encryption System (DES) encryption algorithm.

2. Description of Related Art

The Data Encryption System (DES) encryption algorithm is one of the most widely used symmetric key ciphers in the world. The DES encryption algorithm and associated standards were developed in an era when 8-bit devices and architectures were prevalent. The DES standard includes a permutation of a 64-bit internal data structure to a sequence of 8-bit data elements, to facilitate the use of an 8-bit bus structure. FIGS. 1 and 2 illustrate the permutation of the DES 64-bit structure to and from an 8-bit structure.

In FIG. 1, a 64-bit shift register 100 simultaneously transfers eight selected bits 108, 116, 124, 132, 140, 148, 156, and 164 to an 8-bit output register 190. The output register 190 is conventionally associated with an 8-bit data bus (not shown). Another device on the data bus, for example, the transmitter 520 in FIG. 5, can thereafter access these eight bits via the data bus, for subsequent actions, such as transmission to a receiver 570 in FIG. 5. After the eight bits are "unloaded" 171 onto the data bus, the 64-bit shift register 100 shifts each of its bits down, in the direction of the shift arrow 172. In so doing, the contents of the register at the eight selected bit locations 108, 116, 124, 132, 140, 148, 156, and 164 receive the value of the previously immediately adjacent bit locations 107, 115, 123, 131, 139, 147, 155, and 163. These new values at the eight selected bit locations are transferred to the 8-bit output register 190, for subsequent access by the other device or devices on the data bus. This unload 171 and shift 172 process is repeated until the 64-bit data in shift register 100 is communicated as eight 8-bit data elements via the register 190. That is, after seven shifts, the value from the first bit location 101 of shift register 100 will be located in the selected bit location 108, and transferred to the output register 190. As illustrated in FIG. 1, the contents of the eight selected bit locations 108, 116, 124, 132, 140, 148, 156, and 164 are transferred to the output register 190 in a permuted form. The fortieth register 140 of shift register 100 is associated with the first bit location 191 of shift register 190; the eighth register 108 of shift register 100 is associated with the second bit location 192 of the shift register 190; and so on.

In FIG. 2, a 64-bit shift register 200 simultaneously receives eight selected bits 201, 209, 217, 225, 233, 241, 249, and 257 from an 8-bit input register 290. The input register 290 is conventionally associated with an 8-bit data bus (not shown), and corresponds to the output register 190. The registers 190, 290 are presented herein for ease of understanding; in many embodiments, the 8-bit data is presented directly to the 8-bit data bus from the shift registers 100, 200, without the use of the intervening registers 190, 290. That is, for example, the transmitter 520 in FIG. 5 will receive the aforementioned selected bits from a register 100 in the encrypter 510 via the 8-bit register 190, or an 8-bit data bus, and transmit these bit values to the receiver 570; the receiver 570 will place the received eight bits from the transmitter 520 into the 8-bit register 290, or onto an 8-bit data bus, for subsequent access by a decrypter 560 that contains the 64 bit shift register 200. After receiving the data from the 8-bit register 290, the 64-bit shift register 200 shifts each of its bits down, in the direction of the shift arrow 272. In so doing, the contents of the shift register 200 at the eight selected bit locations 201, 209, 217, 225, 233, 241, 249, and 257 transfer the value to the immediately adjacent bit locations 202, 210, 218, 226, 234, 242, 250, and 258. After the contents of the 64-bit shift register 200 are shifted, the next 8-bit data element 290B is received into the data register 290, and thereby communicated to the eight selected bit locations 201, 209, 217, 225, 233, 241, 249, and 257. This shift 272 and load 271 process is repeated until the eight 8-bit data elements 290A, 290B, 290C, 290D, 290E, 290F, 290G, and 290H are loaded via the 8-bit register 290 into the 64-bit shift register 200. That is, for example, after seven shifts, the value from the second bit location 292 of the first 8-bit data element 290A will be located in the eighth bit location 208 of shift register 200, while the value from the second bit location 292 of the last 8-bit data element 290H will be located in the first bit location 201 of shift register 200. The values of the second bit location 292 of each of the intermediate 8-bit data elements 209B–209G will be located in the seventh 207 through second 202 register locations of the shift register 200. As illustrated in FIG. 2, the contents of the output register 290 are transferred to the eight selected bit locations 201, 209, 217, 225, 233, 241, 249, and 257 in a permuted form. This permuted form is the inverse of the permutation effected between the selected bit locations 108, 116, 124, 132, 140, 148, 156, and 164 of the 64-bit shift register 100 and the output register 190, illustrated in FIG. 1.

The DES permuted 64-bit transfer to and from an 8-bit data structure is fairly efficient in a system that uses an 8-bit architecture. However, an 8-bit architecture is no longer common in the art, having been supplanted by the common use of a 32-bit architecture. As illustrated in FIGS. 3 and 4, the conventional DES permuted 64-bit transfer is not particularly well suited to a system that uses a 32-bit architecture. As would be evident to one of ordinary skill in the art, because of the number of crossovers in the transfer paths 380 (480) of FIG. 3 (4) between the 64-bit shift register 300 (400) and the 32-bit data register 390 (490) the physical layout of the wiring between the shift register 300 (400) and the data register 390 (490) can be expected to be complex and area inefficient. Additionally, the structure presented in FIG. 3 (4) requires a 4-bit shift between unload (load) operations. To avoid the time required for a 4-bit shift, alternative architectures are used that employ non-standard devices and structures, requiring more time and effort to design and layout than conventional devices and structures. In like manner, in a software-based DES system, non-standard algorithms are typically required to move the contents of the shift register 300 to the data register 390, and the contents of the data register 490 to the shift register 400, because of the complex and somewhat non-algorithmic nature of the mapping.

BRIEF SUMMARY OF THE INVENTION

It is an object of this invention to provide a DES permutation that is well suited for data transfers of 64-bit DES data structure to and from a 32-bit data structure. It is another object of this invention to provide a DES permutation that is area efficient for hardware implementations. It is another object of this invention to provide a DES permutation that is efficient in processing and transfer time. It is another object of this invention to provide a DES permutation that is computationally efficient for software implementations.

These objects and others are accomplished by providing a DES permutation that has minimal crossovers between the DES 64-bit structure and the 32-bit data structures, allows for efficient data transfer, and is easily encoded as a software algorithm. Every other bit location in the DES 64-bit data structure is mapped to a contiguous bit location in the 32-bit data structure, in a sequential order. The sequential mapping to contiguous bit locations minimizes potential crossovers that are area inefficient, and allows for encoding algorithms that effect the mapping by using incrementing operators only.

BRIEF DESCRIPTION OF THE DRAWINGS

The invention is explained in further detail, and by way of example, with reference to the accompanying drawings wherein.

DETAILED DESCRIPTION OF THE INVENTION

Figure 5:
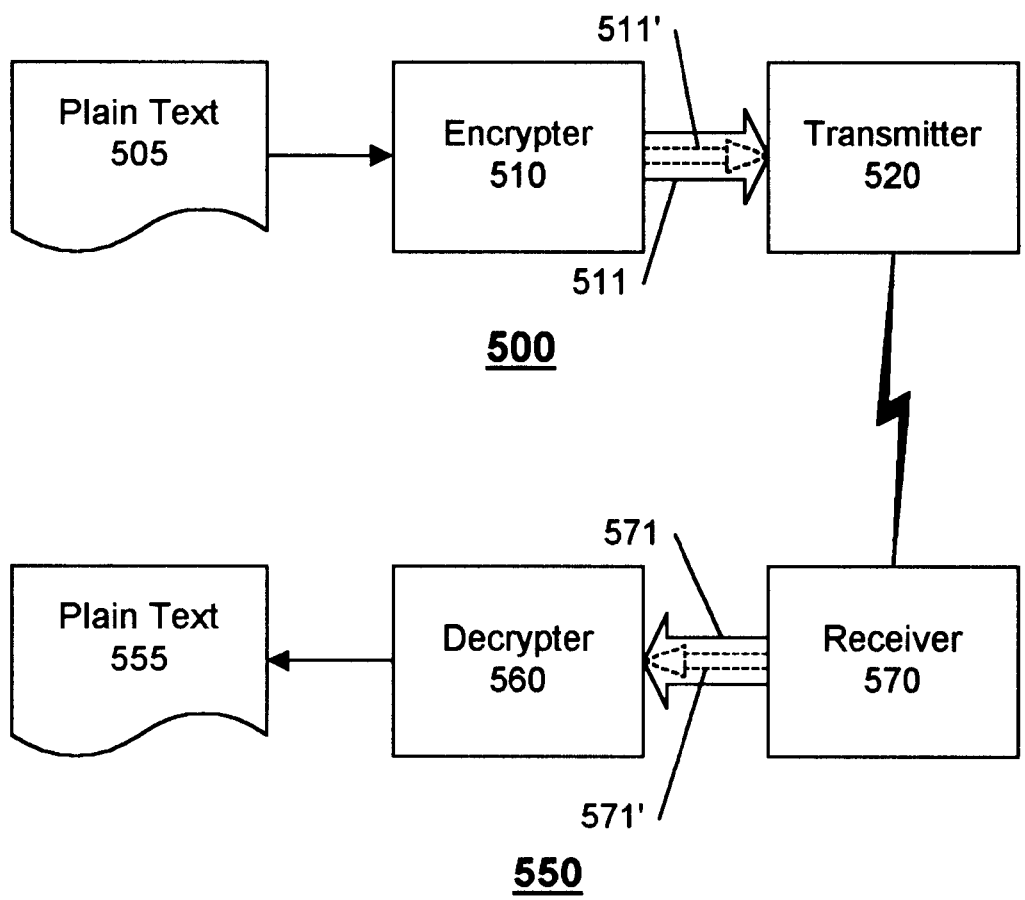
FIG. 5 illustrates an example DES encryption and decryption system in accordance with this invention.

FIG. 5 illustrates an example DES encryption 500 and decryption 550 system. The encryption system 500 includes an encrypter 510 and transmitter 520; the decryption system 550 includes a receiver 570 and a decrypter 560. The encrypter 510 receives the contents of a plain text input document 505, and encrypts the contents using a symmetric key and the DES encryption algorithm. The encrypted contents are communicated to the transmitter 520 via a data path 511. The data path 511 is conventionally a parallel path having a width of parallel access that is defined in terms of the number of bits that can be transferred in parallel. In prior generations, the common width of the data path was 8-bits, and is illustrated in FIG. 5 by the dashed arrow 511'. In later generations, the common width of the data path became 32-bits, and is illustrated by the solid arrow 511 which is illustrated as being substantially larger than the dashed arrow 511'. As discussed above, the conventional DES internal architecture uses a 64 bit data structure for the encrypted data, and therefore the transfer of the encrypted data items is via two 32 bit transfers to the transmitter 520. The transmitter 520 communicates the encrypted data items to the receiver 570 for subsequent decryption at the decrypter 560 to produce a copy 555 of the plain text 505 at the receiver site. The transmitter 520 and receiver 570 may include any means for communicating data, such as a pair of modems for transfer via a telephone or cable connection, a pair of network adapters, a pair of serial interface devices, and so on. The transfer of the encrypted data between the receiver 570 and the decrypter 560 is via a 32 bit data path 571, which is illustrated as being substantially larger than the prior generation 8 bit data path 571'. As in the encryption system 500, the transfer of the encrypted data items to the DES 64 bit internal structure is via two 32 bit transfers from the receiver 560.

Figure 1:
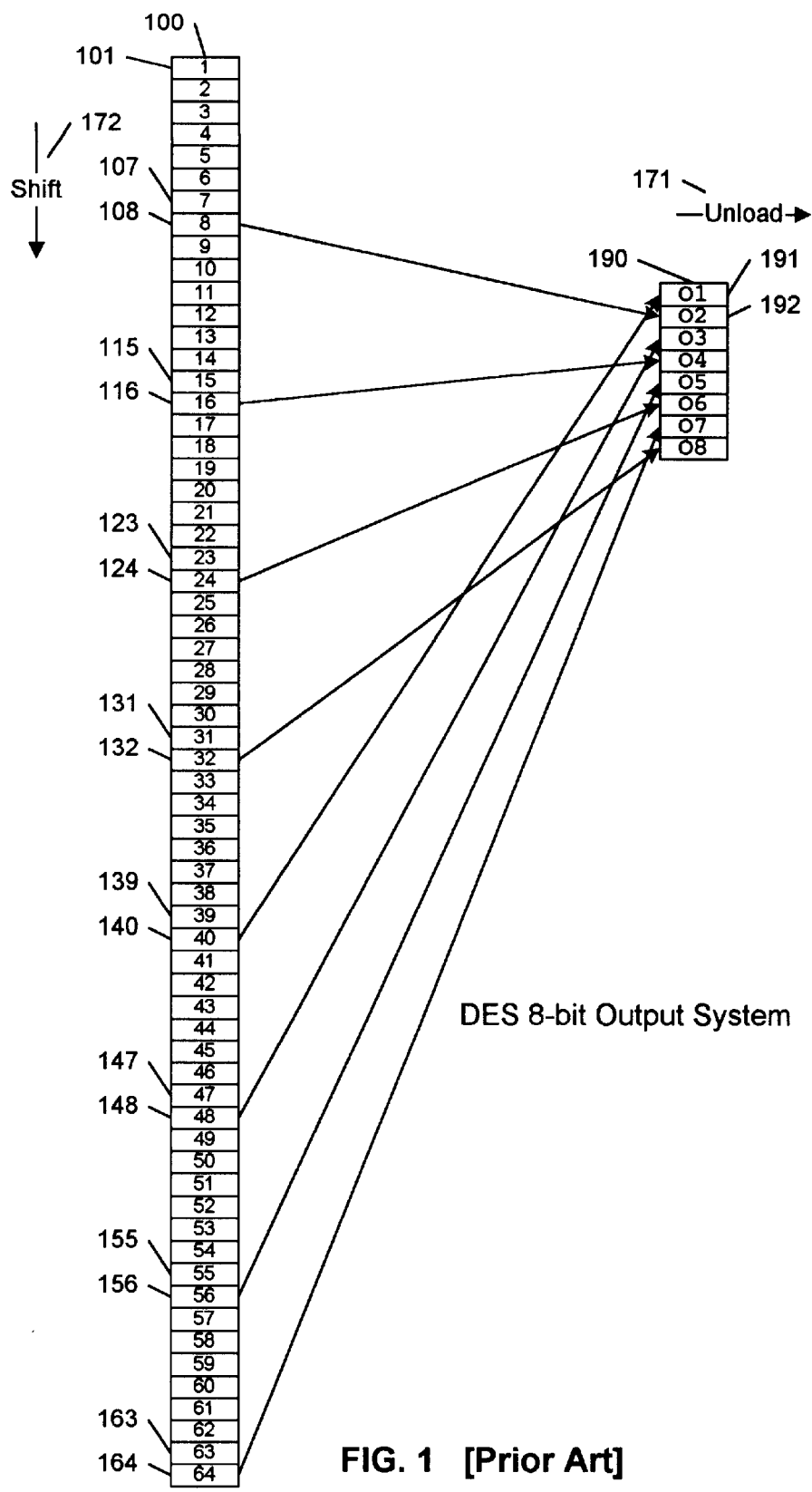
FIG. 1 illustrates a conventional DES 8-bit output system.
Figure 2:
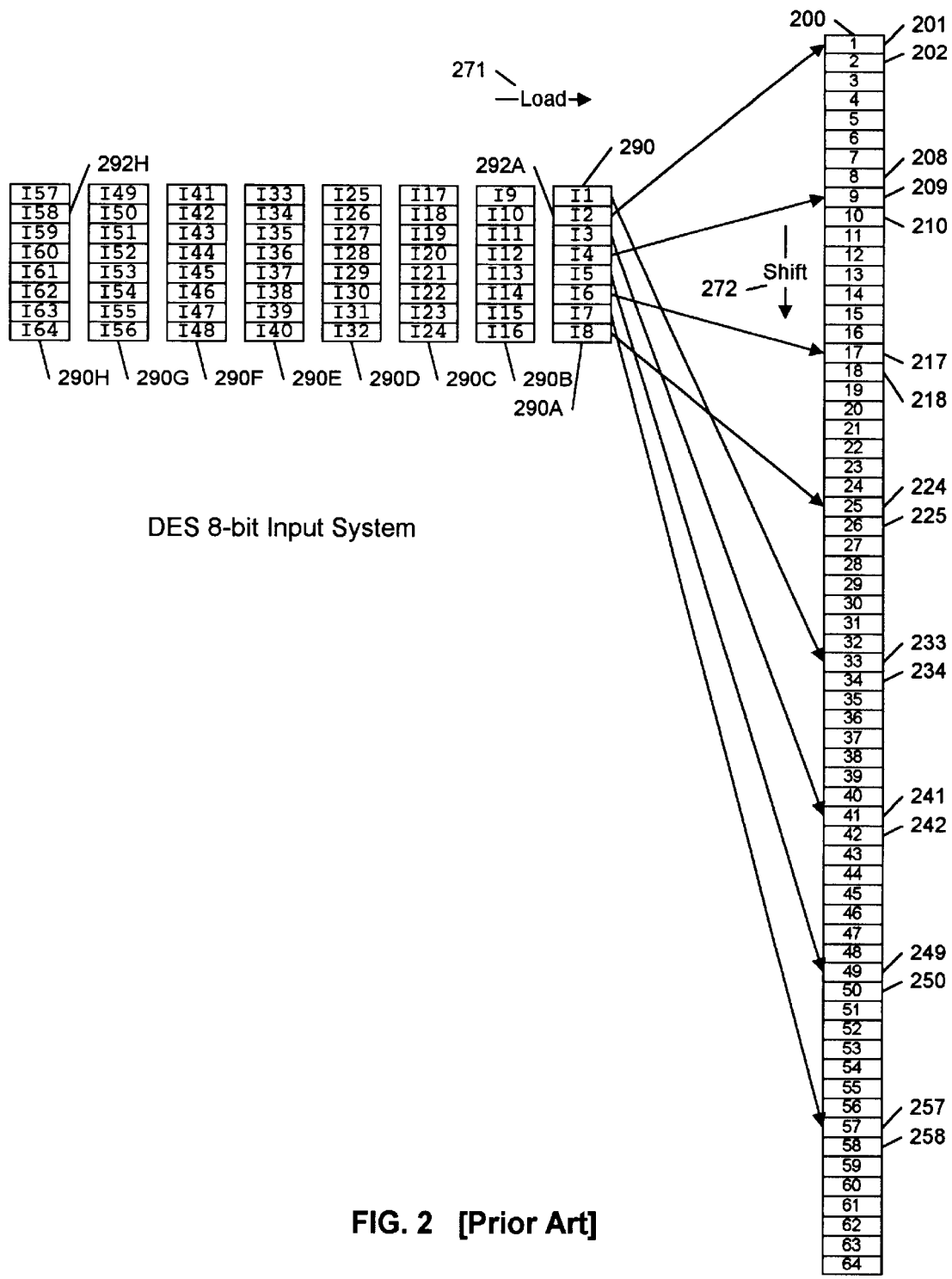
FIG. 2 illustrates a conventional DES 8-bit input system.
Figure 3:
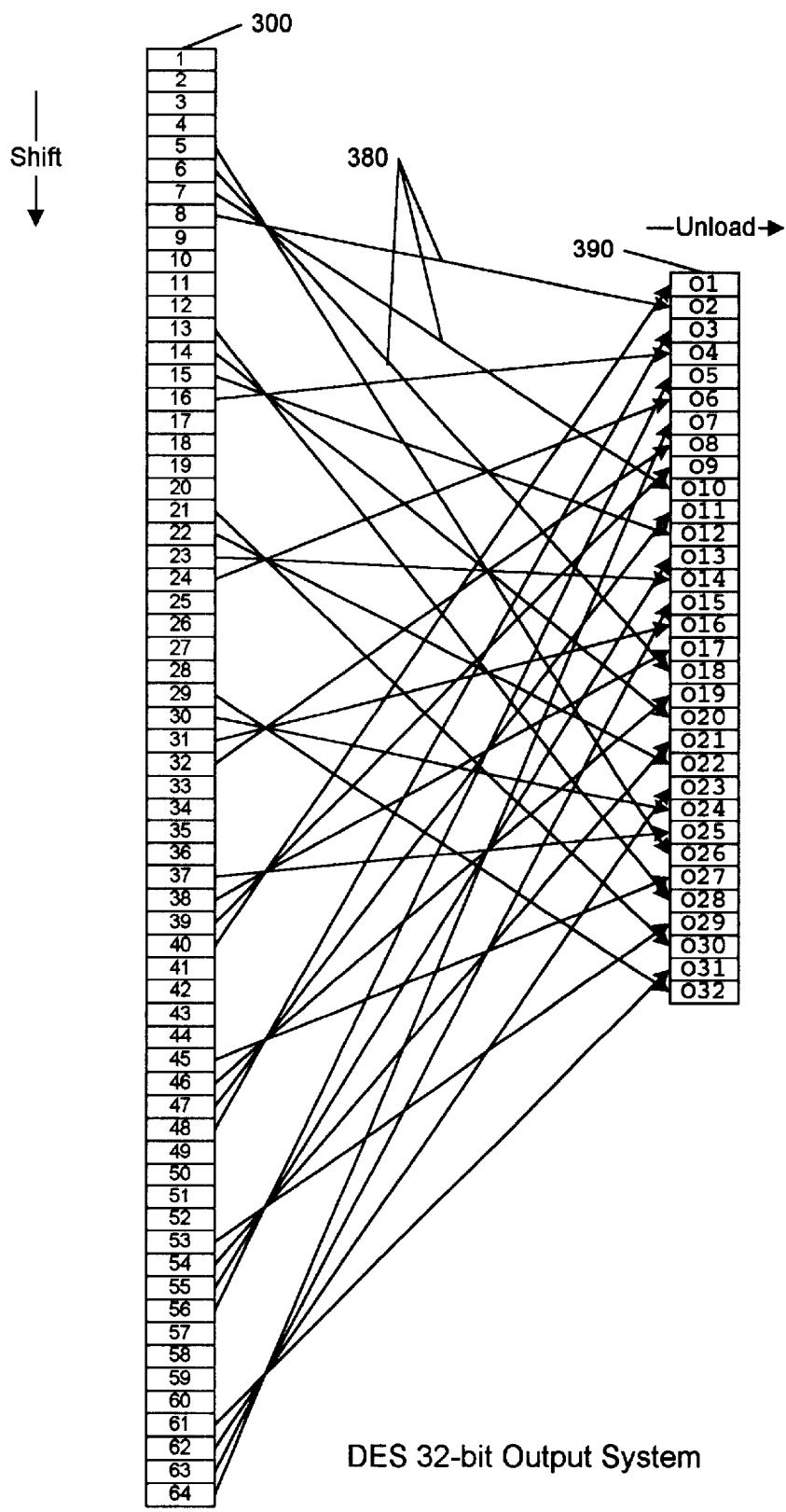
FIG. 3 illustrates a conventional DES 32-bit output system.
Figure 4:
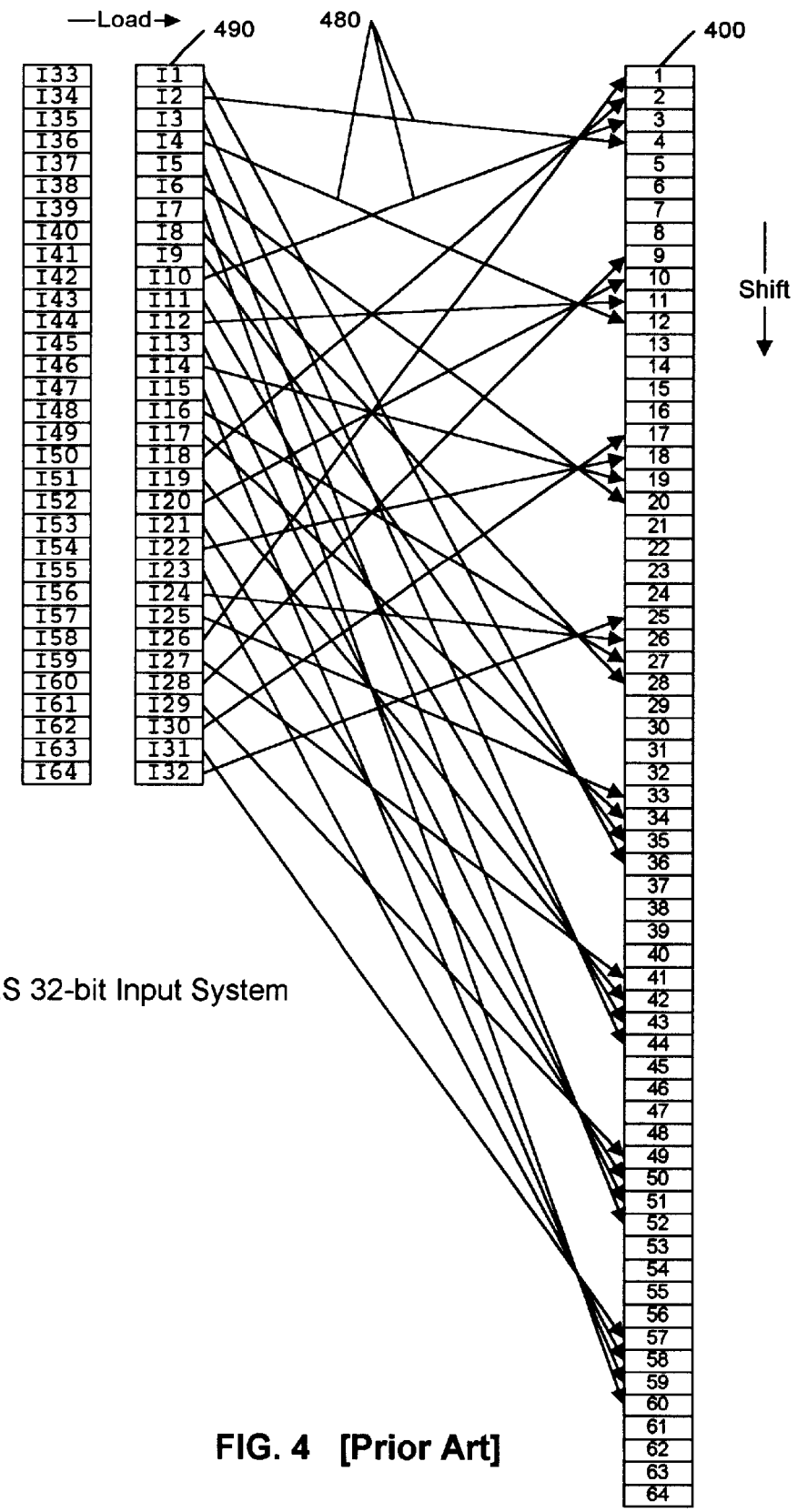
FIG. 4 illustrates a conventional DES 32-bit output system.
Figure 6:
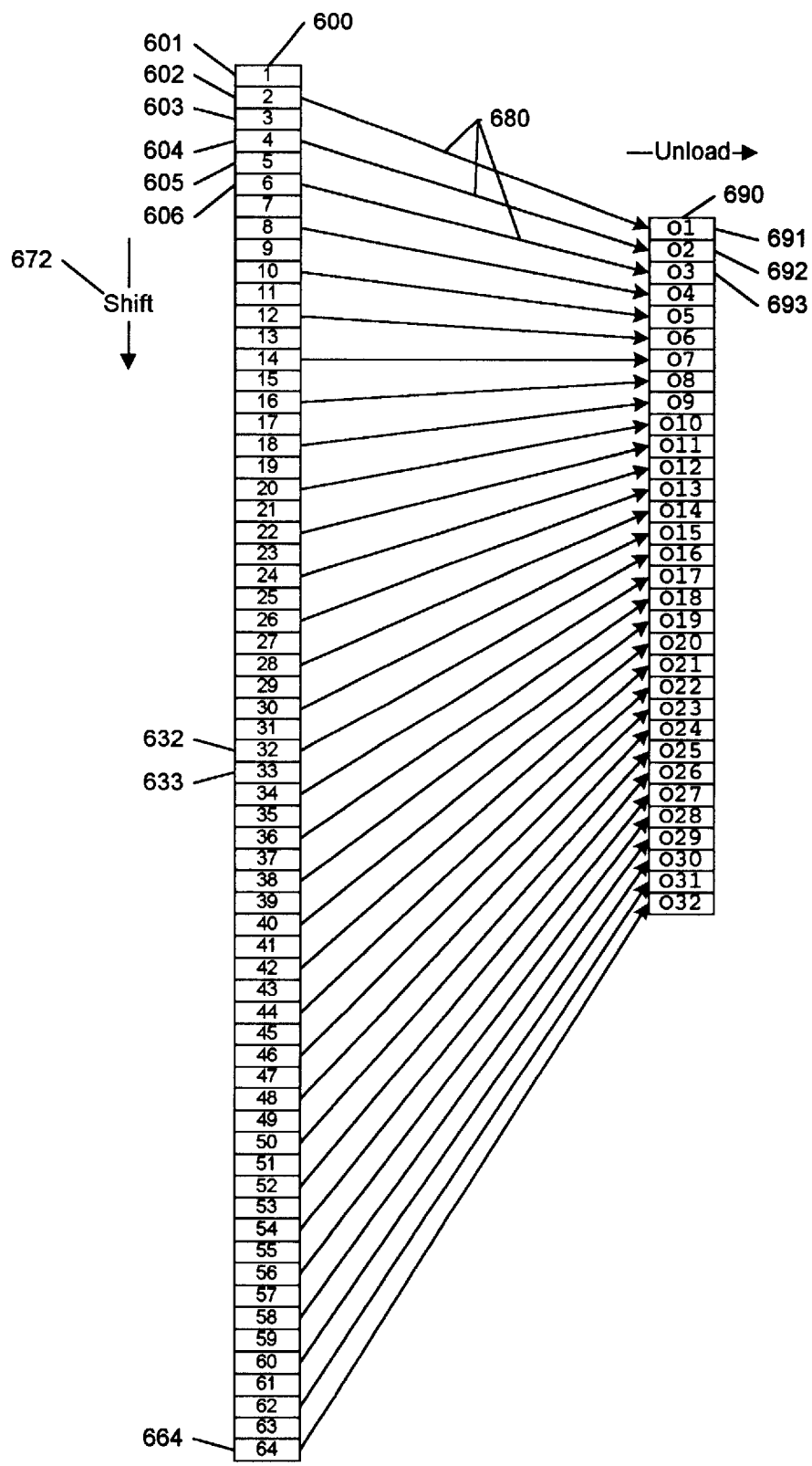
FIG. 6 illustrates an example DES 32-bit output system in accordance with this invention.
Figure 7:
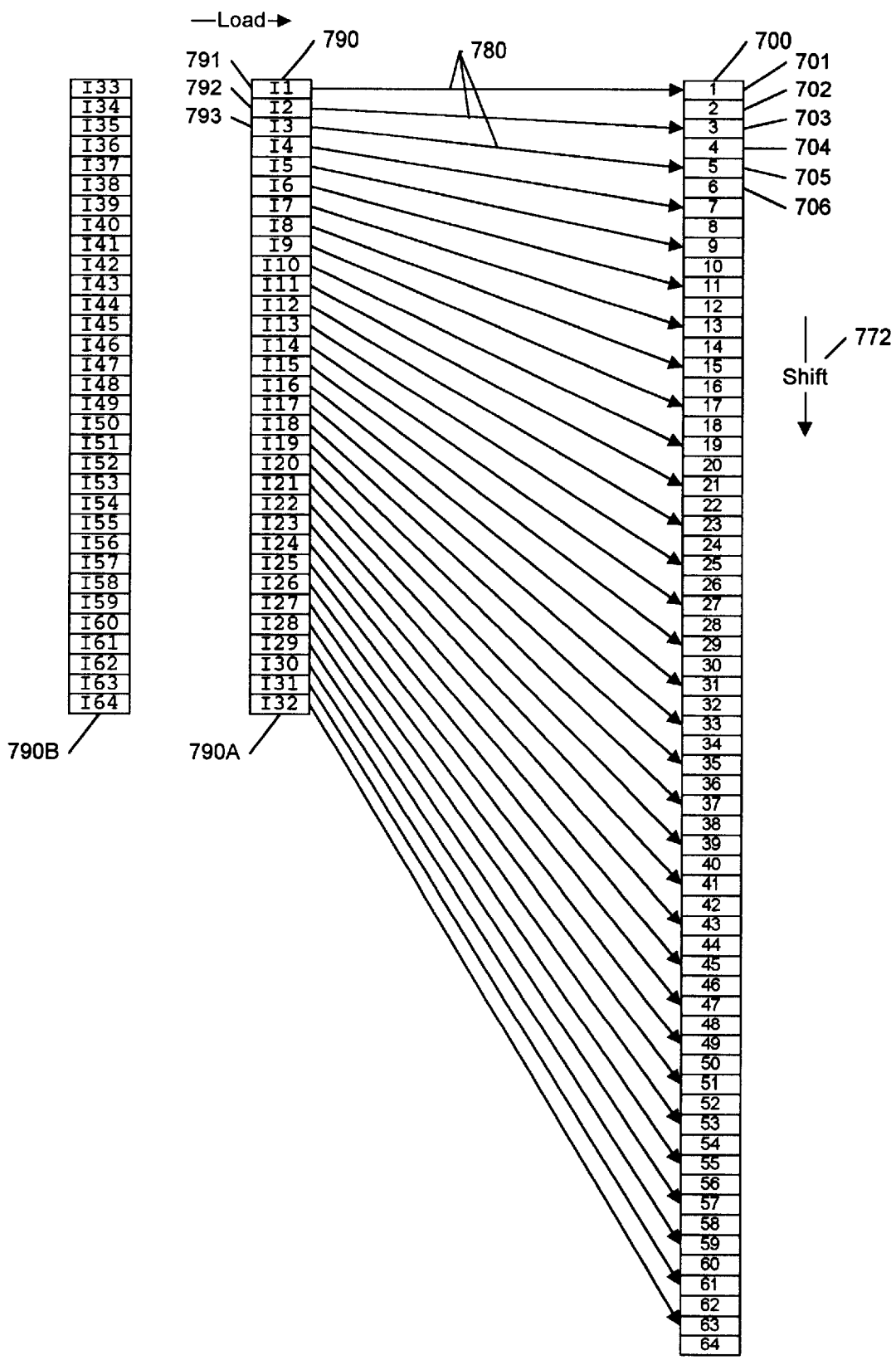
FIG. 7 illustrates an example DES 32-bit input system in accordance with this invention.

In the preferred embodiment of this invention, every other bit of the DES 64 bit data structure is mapped to contiguous bits in a 32 bit data structure sequentially, as illustrated in FIGS. 6 and 7. The 32 bit DES output system of FIG. 6 maps the 64 bit internal data structure to a 32 bit output structure. The 64 bit internal structure is illustrated as being embodied as a shift register 600. The 32 bit output structure is illustrated as being embodied as a data register 690. As would be evident to one of ordinary skill in the art, the 32 bit structure may merely be embodied as a set of 32 wires or interconnections, and would be commonly termed a 32 bit data bus. The embodiment of the 32 bit structure as a data register 690 is presented herein for ease of terminology and understanding. As illustrated in FIG. 6, the second bit location 602 in the shift register 600 is mapped to the first register 691 of the data register 690; the fourth bit location 604 is mapped to the second register 692; the sixth bit location 606 is mapped to the third register 693; and so on. The use of an every-other sequential mapping has a number of advantages. As can be seen from FIG. 6, the transfer paths 680 between the shift register 600 and the data register 690 exhibits no crossovers, and therefore is likely to allow for a simple and area efficient interconnection embodiment. By providing an every-other sequential mapping, rather than, for example, a mapping of the first half 601–632 or the second half 633–664 of the register 600 to the data register 690, allows for the replacement of the values of the even numbered bit locations 602, 604, 606, . . . of the register 600 by the values of the odd numbered bit locations 601, 603, 605, . . . of the register 600 via a single shift operation 672. If, for example, each location of the second half 633–664 of the register had been connected to each register of the data register 690, replacing the values of the thirty-two locations by the first half 601–632 of the shift register would require thirty two shift operations. Conversely, however, the every-other sequential mapping of the preferred embodiment may be somewhat less efficient than a mapping of half the 64 bit structure directly to the 32 bit structure in a software embodiment. The use of the every-other sequential mapping of this invention in software, however, can be expected to typically require fewer operations than the conventional prior-art DES mappings of FIGS. 3 and 4. That is, the preferred embodiment of this invention is particularly well suited, albeit not necessarily optimal, for both hardware and software embodiments, or a combination of the two.

Figure 8:
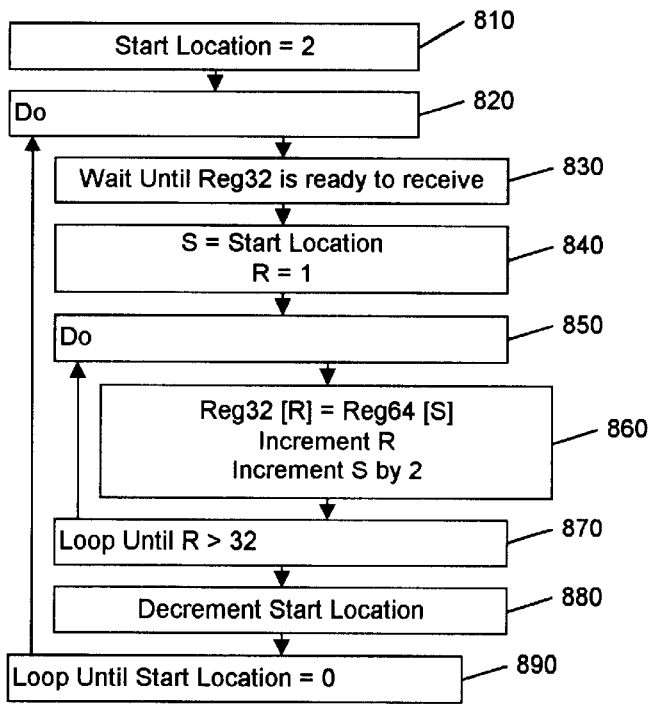
FIG. 8 illustrates an example flowchart for a DES 32-bit output system in accordance with this invention.

FIG. 8 illustrates an example flowchart of a software embodiment of the DES 32 bit output system in accordance with this invention. The starting index to the 64 bit data structure is initialized to 2, at 810, corresponding to 602 in FIG. 6. The loop 820–890 is executed twice, first starting at this location, then at starting location 1, corresponding to 601 in FIG. 6. The transfer of the values from the 64 bit structure to the 32 bit structure begins when the 32 bit structure is ready 830 to receive these values. An index S to the 64 bit structure is initialized to the start index, and an index R to the 32 bit structure is initialized to 1, at 840. The loop 850–870 loads the 32 bit values from the 64 bit structure by loading each bit, as indexed by S, into the 32 bit structure, indexed by R, then incrementing R by one and S by two, at 860, until R exceeds 32, at 870. At 880, the starting index is decremented by one. If the starting index is 1, at 890, the loop 820–890 is repeated, otherwise the loop is terminated, having completed two transfers of 32 bits each. As shown, the every-other sequential mapping process provides for a relatively simple algorithm for effecting the mapping, as compared to the less regular processing typically associated with the DES output system of FIG. 3.

The 32 bit DES input system of FIG. 7 maps the 32 bit input data structure to the 64 bit internal structure. The 64 bit internal structure is illustrated as being embodied as a shift register 700. The 32 bit input structure is illustrated as being embodied as a data register 790. As in FIG. 6, the embodiment of the 32 bit structure as a data register 790 is presented herein for ease of terminology and understanding. As illustrated in FIG. 7, the first register 791 of the data register 790 is mapped to the first bit location 701 in the shift register 700; the second register 792 is mapped to the third bit location 703; the third register 793 is mapped to the fifth bit location 705; and so on.. As in the output system of FIG. 6, the transfer paths 780 between the data register 790 and the shift register 700 exhibits no crossovers, and therefore is likely to allow for a simple and area efficient interconnection embodiment. And, as in FIG. 6, the use of an every-other sequential mapping allows the transfer of the values of the first 32 bit values 790A to alternate locations 702, 704, 706, etc. via a single shift operation 772, allowing the load of the next 32 bit values 790B to the mapped locations 701, 703, 705, etc.

Figure 9:
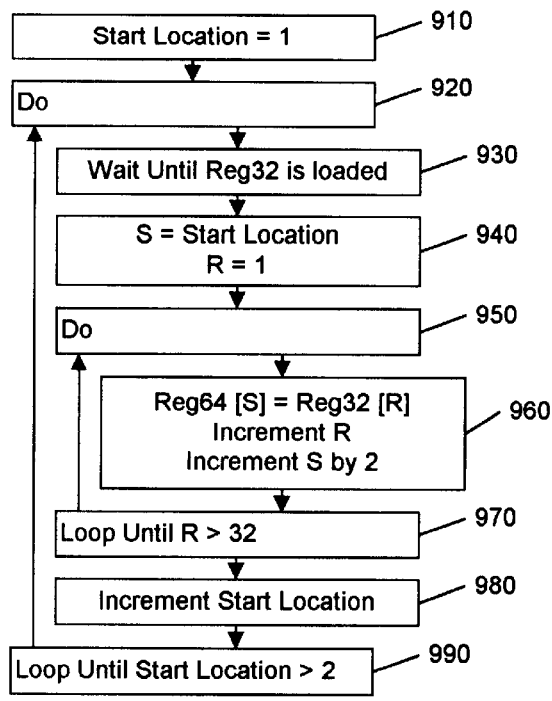
FIG. 9 illustrates an example flowchart for a DES 32-bit input system in accordance with this invention.

FIG. 9 illustrates an example flowchart of a software embodiment of the DES 32 bit input system in accordance with this invention. The starting index to the 64 bit data structure is initialized to 1, at 910, corresponding to 701 in FIG. 7. The loop 920–990 is executed twice, first starting at this location, then at starting location 2, corresponding to 702 in FIG. 7. The transfer of the values from the 64 bit structure to the 32 bit structure begins when the 32 bit structure contains 830 the appropriate information. An index S to the 64 bit structure is initialized to the start index, and an index R to the 32 bit structure is initialized to 1, at 940. The loop 950–970 loads the 32 bit values from the 32 bit structure, indexed by R, to the 64 bit structure, indexed by S, then incrementing R by one and S by two, at 960, until R exceeds 32, at 970. At 980, the starting index is incremented by one. If the starting index is 2, at 990, the loop 920–990 is repeated, otherwise the loop is terminated, having completed two transfers of 32 bits each. As shown, the use of an every-other sequential mapping allows the input transfer via the use of a relatively simple algorithm, rather than the less regular processes typically utilized in the conventional DES input mapping of FIG. 4.

The foregoing merely illustrates the principles of the invention. It will thus be appreciated that those skilled in the art will be able to devise various arrangements which, although not explicitly described or shown herein, embody the principles of the invention and are thus within its spirit and scope. For example, other software algorithms, optimized for the particular system upon which the software is executed, may be used to perform the mappings of FIGS. 6 and 7. In like manner, devices other than shift registers and data register may be employed to process the data as 64-bit and 32-bit data structures, and the principles of this invention may be used for other applications that require efficient transfers between N-bit and N/2-bit structures.

I claim:

1. A method for transferring an encrypted item having an N-bit data structure via an N/2-bit data bus, wherein the encrypted item consists of a set of odd bit values in the N-bit data structure and a set of even bit values in the N-bit data structure, and the method includes the steps of:

placing the set of even bit values of the encrypted item onto contiguous bits of the N/2-bit data bus in sequential order, waiting for the N/2-bit data bus to be ready to receive the set of odd bit values, and placing the set of odd bit values of the encrypted item onto the contiguous bits of the N/2bit data bus in sequential order.

2. The method of claim 1, wherein the step of placing the set of odd bit values of the encrypted item onto the contiguous bits of the N/2 bit data bus includes the steps of:

replacing the set of even bit values with the set of odd bit values by shifting each of the set of odd bit values into an adjacent each of the set of even bit values, and thereafter placing the set of even bit values of the encrypted item onto the contiguous bits of the N/2-bit data bus in sequential order.

3. A method for receiving an encrypted item having an N-bit data structure via a first N/2-bit data transfer and a second N/2-bit data transfer, wherein the encrypted item consists of a set of odd bit values in the N-bit data structure and a set of even bit values in the N-bit data structure, and the method includes the steps of:

placing contiguous bits of the first N/2-bit data transfer into the set of odd bit values of the encrypted item in sequential order, waiting for the second N/2-bit data transfer, and placing contiguous bits of the second N/2-bit data transfer into the set of even bit values of encrypted item in sequential order.

4. The method of claim 3, wherein the step of placing contiguous bits of the first N/2-bit data transfer into the set of even bit values of the encrypted item includes the steps of placing contiguous bits of the first N/2-bit data transfer into the set of odd bit values of the encrypted item in sequential order, and thereafter shifting each of the set of odd bit values into an adjacent each of the set of even bit values.

* * * * *